Patented Nov. 29, 1932

1,889,530

UNITED STATES PATENT OFFICE

JOHN S. BEEKLEY, OF CHARLESTON, WEST VIRGINIA, ASSIGNOR, BY MESNE ASSIGNMENTS, TO E. I. DU PONT DE NEMOURS & COMPANY, OF WILMINGTON, DELAWARE, A CORPORATION OF DELAWARE

PROCESS FOR THE MANUFACTURE OF HYDROGEN

No Drawing.    Application filed November 8, 1930. Serial No. 494,449.

This invention relates to a process for the manufacture of hydrogen by the interaction of a hydrocarbon with steam in the presence of a catalyst and particularly to effecting such a reaction in a plurality of catalytic reaction stages.

In the commercial manufacture of hydrogen from steam and a hydrocarbon in the presence of a catalyst there has been considerable difficulty encountered in sustaining the temperature of the reaction, within the catalytic mass, due to the reaction being highly endothermic. Various expedients have been suggested, therefore, to supply the necessary heat to the reaction. For instance, it has been proposed to employ electrical heating within the catalyst bed, external heating of the catalyst chamber, the injection of oxygen into the gas during the reaction, thereby supplying the needed heat by partial combustion of the reacting gases, and many other processes. The proposed methods, however for sustaining the temperature of the reaction, which are for use in single stage processes, do not afford ease of controlling the reaction temperature and at the same time require but simple apparatus in which to effect it.

An object of the present invention is to provide a process for the preparation of hydrogen by the interaction of a hydrocarbon and steam in the presence of a catalyst. A further object of this invention is to provide a process for affording accurate control of the temperature of the reaction. A still further object of the invention is to provide a process in which a hydrocarbon is converted into hydrogen by means of a plurality of catalytic reaction stages. Other objects will hereinafter appear.

In conducting the hydrocarbon-steam reaction, and particularly when conducting it at temperatures below 700° C., I have found that in order to obtain efficient conversion in a single deep catalyst bed, of the usual type, it is necessary to heat the gases prior to their admission thereto to a temperature much higher than the optimum conversion temperature. For example, an excellent conversion temperature, when using a nickel catalyst promoted with aluminum oxide, is approximately 525° C. To effect substantially complete conversion in such a catalytic mass in a single converter, the necessary inlet temperature of the gas should be approximately 825° C. and with even as high an inlet temperature as this the exit temperature will be well below the optimum temperature for the conversion. As would be expected, a rapid deterioration and loss of activity of the expensive catalytic mass, particularly that portion with which the gases initially contact, results. I have found that these disadvantages can be overcome by effecting the reaction in a plurality of catalytic reaction stages while supplying to the gases between the stages the quantity of heat lost in the preceding stage prior to their admission into the succeeding stage. Furthermore, if the space velocity of the gases in each stage be so regulated that it is proportional to the rate of reaction in that stage accurate temperature control of the catalysis and the progress of the reaction can be maintained. By this process the gases remain in contact with the catalyst in each stage a length of time governed substantially by the composition of the gases, whereby efficient conversion in each conversion chamber and an accurate control of the temperature of the whole reaction are obtained while the temperature drop through each converter can be held within proper limits.

When preparing hydrogen by my process, the mixture of hydrocarbon and steam is generally preheated to a predetermined temperature which is sufficient to give an average optimum temperature of the gases in the first conversion stage. The gases prior to their admission into the first conversion stage are so far from equilibrium that when they contact with the catalyst a rapid reaction is set up with a resultant rapid loss in temperature. With each subsequent stage of the reaction, assuming equivalent temperature and other operating conditions in each stage, the gases are successively closer to equilibrium with a result that the reaction velocity in the latter stages generally successively decreases. By controlling the space velocity in a manner which is substantially proportional to the reaction rate in each stage I have found that efficient conversion can be effected in any stage no matter what the velocity of the reaction be in that stage. Consequently the disadvantages of the high reaction rate resulting in a rapid loss in temperature and ultimately in efficiency of conversion and the disadvantages of low percentage conversion at the lower temperatures are greatly offset by my invention. Although, as above indicated, the reaction rate generally decreases from the first to the last stage, this is not necessarily true under all conditions of operation, for by employing a low temperature during the first stages of the reaction and increasing the temperature of the conversion during the latter stages the effect of the nearness of the gases to equilibrium is less marked so that the higher reaction velocities may even be met with in the latter stages. In any event by utilizing a space velocity in any stage proportional to the velocity of the reaction in that stage, the advantages of this phase of my invention will be realized.

Due to the endothermic nature of the hydrocarbon-steam reaction, the temperature drop in each stage of the conversion, although controlled within certain limits by the regulation of the space velocity, is such that the gases must be heated prior to their entering the next conversion stage. This interheating of the gases between conversion operations can be carried out by passing them preferably through suitable heat exchangers out of direct contact with the heating fluid. By a correlation of the heat added, prior to the first stage and between the subsequent stages, with the space velocity an equal temperture drop through each stage can be effected. While this is not absolutely essential to the operation of my invention, nevertheless, it affords an accurate control of the conditions of operation.

In order to realize the ultimate utility of my process it is not material that any particular number of conversion stages be employed, although I have found that by using three stages an excellent working balance can be struck between the cost of the apparatus and the advantages of using a plurality of conversion stages. When using some catalysts, however, it may prove of advantage to use a greater or lesser number of stages.

The interheaters employed between the catalytic reaction stages, which feed into the cooled gases the amount of heat lost in the preceding stage, may be of any suitable type. Owing to the ease of installation various commercial heaters are available when multiple stage conversion is employed, while the types of heaters available, for single-stage conversion processes and for use within the converters themselves to supply heat to the reaction, are limited due to exact construction requirements and other difficulties. In my process, therefore, inexpensive heaters may be used employing any available fuel.

The overall space velocity which has proven to be advantageous when methane is converted in the presence of steam with a catalyst, such as those described by Roger Williams, in his U. S. application Ser. No. 118,600, is in the neighborhood of 250 and is determined by dividing the volume of hydrocarbon under standard conditions of temperature and pressure, flowing per hour, by the total volume of catalyst with which the gases contact. The overall space velocity may vary considerably between, say 50 and 2000, when certain catalysts are used, but the employment of about 250 generally gives excellent percentage conversion with known methane conversion catalysts. If three separate conversion stages be employed, for example, the space velocity in the first may be from, say 2000–50,000, the second 500–12,500, and the third 100–2500, giving the desired overall space velocity for the particular catalyst and taking into consideration the reaction rate in the particular stage as well as other conditions of conversion such as steam to gas ratio, temperature, pressure, etc.

It will be understood that there are numerous variations which may be employed in practicing my process. The example described below, therefore, which is given to more fully acquaint the expert in this art with a practical application of my invention, will not in any way limit its scope by the specific details of temperature, pressure, space velocity, etc. therein disclosed.

Crush pumice stone and screen to 8–14 mesh. Wash with boiling hydrochloric acid until free from iron and then with boiling distilled water until free from chlorides. After drying at 200° C., stir 100 parts at that temperature into 50 parts of a boiling solution of nickel nitrate containing 2.6 parts of cerium nitrate, all of which should be free from sulphur, halogens, and other contact poisons, in 70 parts of distilled water. After absorption is complete remove the pumice from the solution and calcine at 400° C. until the nitrogen oxides have been expelled. Place this calcined product in a series of simple converters, the first holding approximately 1½ cu. ft. of the catalyst, the second 3½ cu. ft., and the third 14 cu. ft., and reduce therein in an atmosphere of hydrogen at a temperature of 400° C. for one hour. A gaseous mixture containing 10 volumes of steam per volume of methane is passed through the converters placed in series at a rate of approximately 4000 cu. ft. of methane per hour whereby the space velocity will decrease proportionally from the first to the last stage. This will give the greatest space velocity in the first converter wherein the most rapid reaction rate is encountered and the lowest space velocity in the last converter wherein the least rapid reaction rate is met with under these conditions of operation. By thus regulating the space velocity in each converter, a substantially equal temperature drop is obtained in each. The gases are preheated prior to entering the first converter to a temperature of approximately 650° C.,—at the exit of this converter the temperature will have dropped to approximately 525° C. The heat of the gases is increased again to 650° C. by external heat exchange with any suitable type of heater and the cycle repeated to the last converter.

There are many advantages realized by effecting a substantially equal temperature drop through each conversion stage. For instance, the catalytic mass in each is maintained at its optimum working temperature, thus giving long catalyst life with high conversion and as the length of life of each catalyst bed is approximately the same, the operations are not intermittently interrupted by the necessity of replenishing an exhausted catalyst in one of the converters.

Various changes may be made in the above process for the preparation of hydrogen from the hydrocarbons and particularly those of the paraffin series as well as in the catalyst, space velocity, steam to gas ratio, and other factors employed, providing a plurality of converters be used with external heaters between the converters, and, if desired, the space velocity in each be varied in proportion to the reaction rate therein, without departing from the invention or sacrificing any of the advantages that may be derived therefrom.

I claim:

1. A process for the preparation of hydrogen by the interaction of steam and a gaseous hydrocarbon which comprises conducting the conversion of the hydrocarbon in a plurality of separate catalytic reaction stages, the space velocity in each stage being substantially proportional to the reaction rate in that stage.

2. A process for the preparation of hydrogen by the interaction of steam and a gaseous hydrocarbon which comprises conducting the conversion of the hydrocarbon in a plurality of separate catalytic reaction stages, the space velocity in each stage being substantially proportional to the reaction rate in that stage, the quantity of heat lost in each stage being added to the gases prior to their entry into the succeeding stage.

3. A process for the preparation of hydrogen by the interaction of steam and a gaseous hydrocarbon which comprises conducting the conversion of the hydrocarbon in three catalytic reaction stages, the space velocity in each stage being substantially proportional to the reaction rate in that stage.

4. A process for the preparation of hydrogen by the interaction of steam and a gaseous hydrocarbon which comprises conducting the conversion of the hydrocarbon in three catalytic reaction stages, the space velocity in each stage being substantially proportional to the reaction rate in that stage, the quantity of heat lost between stages being added to the gases prior to their entry into the succeeding stage.

5. A process for the preparation of hydrogen by the interaction of steam and a gaseous hydrocarbon which comprises conducting the conversion of the hydrocarbon in a plurality of separate catalytic reaction stages, the temperature drop thru each stage being substantially equal.

6. A process for the preparation of hydrogen by the interaction of steam and a gaseous hydrocarbon which comprises conducting the conversion of the hydrocarbon in three catalytic reaction stages, the hydrocarbon and steam entering each stage at a temperature of approximately 650° C. and leaving each stage at a temperature of approximately 525° C.

7. The process for the preparation of hydrogen by the interaction of steam and methane which comprises conducting the conversion of the methane in a plurality of catalytic reaction stages, heat being added to the gases between the stages by external heat exchange, the heat added between the stages being substantially equal.

8. A process for the preparation of hydrogen by the interaction of steam and a gaseous hydrocarbon which comprises conducting the conversion of the hydrocarbon in a plurality of separate catalytic reaction stages, the space velocity decreasing proportionately from the first to the last stage.

In testimony whereof, I affix my signature.

JOHN S. BEEKLEY.